US009389765B2

(12) United States Patent
Amacker et al.

(10) Patent No.: US 9,389,765 B2
(45) Date of Patent: Jul. 12, 2016

(54) GENERATING AN IMAGE STREAM

(71) Applicant: Google Inc., Mountain View, CA (US)

(72) Inventors: Matthew Amacker, Santa Clara, CA (US); Malay Haldar, Foster City, CA (US)

(73) Assignee: Google Inc., Mountain View, CA (US)

( * ) Notice: Subject to any disclaimer, the term of this patent is extended or adjusted under 35 U.S.C. 154(b) by 188 days.

(21) Appl. No.: 13/795,583

(22) Filed: Mar. 12, 2013

(65) Prior Publication Data

US 2014/0282260 A1    Sep. 18, 2014

(51) Int. Cl.

| G06F 3/048 | (2013.01) |
| G06F 3/0484 | (2013.01) |
| G09B 5/06 | (2006.01) |
| H04N 7/14 | (2006.01) |
| H04N 7/15 | (2006.01) |
| G09B 5/14 | (2006.01) |

(52) U.S. Cl.
CPC ............ *G06F 3/04842* (2013.01); *G09B 5/065* (2013.01); *G09B 5/14* (2013.01); *H04N 7/141* (2013.01); *H04N 7/155* (2013.01)

(58) Field of Classification Search
CPC ... G06F 13/4018; G06F 13/105; G06F 13/32; G06F 13/385; G06F 17/30244; G06F 3/011; G06F 3/013; G06F 3/14
See application file for complete search history.

(56) References Cited

U.S. PATENT DOCUMENTS

| 6,833,863 | B1 | 12/2004 | Clemens | |
| 7,437,005 | B2 * | 10/2008 | Drucker et al. | 382/224 |
| 2001/0026557 | A1 * | 10/2001 | Gaedeken et al. | 370/442 |
| 2002/0126698 | A1 * | 9/2002 | Deshpande | 370/467 |
| 2003/0122861 | A1 * | 7/2003 | Jun | G06F 17/30852 715/720 |
| 2004/0198426 | A1 * | 10/2004 | Squibbs et al. | 455/555 |
| 2004/0221322 | A1 * | 11/2004 | Shen et al. | 725/135 |
| 2005/0210393 | A1 | 9/2005 | Maeng | |

(Continued)

FOREIGN PATENT DOCUMENTS

EP         2447946         5/2012

OTHER PUBLICATIONS

Kim, JW et al., "TCP-friendly Internet Video Streaming employing Variable Frame-rate Encoding and Interpolation" Circuits and Systems for Video Technology, IEEE Transactions on 10(7): 7 pp. 1164-1177.

(Continued)

*Primary Examiner* — William Bashore
*Assistant Examiner* — Rayeez Chowdhury
(74) *Attorney, Agent, or Firm* — Fish & Richardson P.C.

(57) ABSTRACT

Methods, systems, and apparatus, including computer programs encoded on a computer storage medium, for augmenting an interactive session with images. In one aspect, a method includes generating a first linear arrangement of images captured during an interactive session. The images of the first linear arrangement of images can be arranged in order based on a sequence in which the images were captured. The first linear arrangement of images is provided for display. Selection data specifying a selection of an image of the first linear arrangement of images are received. In response to receiving the selection data, a branch point is created at the selected image. The branch point can define a branch from the selected image to a second linear arrangement of images. Additional images captured during the interactive session are received. The second linear arrangement of images is generated that includes the additional images.

24 Claims, 4 Drawing Sheets

(56) References Cited

U.S. PATENT DOCUMENTS

| | | | |
|---|---|---|---|
| 2006/0251103 A1* | 11/2006 | Lee | 370/447 |
| 2007/0270985 A1* | 11/2007 | Shellshear | G06F 3/0481 700/87 |
| 2008/0151817 A1* | 6/2008 | Fitchett | H04W 28/20 370/329 |
| 2009/0100339 A1* | 4/2009 | Wharton-Ali | G11B 27/105 715/720 |
| 2010/0257462 A1* | 10/2010 | Barrett | H04N 7/147 715/756 |
| 2012/0265824 A1* | 10/2012 | Lawbaugh | G06F 11/3089 709/206 |
| 2013/0021430 A1 | 1/2013 | Chao et al. | |
| 2013/0324244 A1* | 12/2013 | Mikhailov | A63F 13/04 463/31 |

OTHER PUBLICATIONS

Axis Communications—"Frame rate control" (online). © Axis Communications AB, 2013. [retrieved on Mar. 12, 2013] Retrieved from the internet: <URL: http://www.axis.com/products/video/about_networkvideo/frame_rate.htm, 1 page.

International Search Report and Written Opinion in International Application No. PCT/US2014/018939, mailed May 26, 2014, 13 pages.

International Preliminary Report on Patentability in International Application No. PCT/US2014/018939, mailed Sep. 24, 2015, 10 pages.

* cited by examiner

GENERATING AN IMAGE STREAM

BACKGROUND

This specification relates to generating an image stream for an interactive session.

Video conferencing enables users to enjoy two way video and audio communications. With the advent of broadband telecommunications, users are increasingly using video conferencing to host conversations, meetings, and other types of communications. However, some users may not have access to a broadband connection, for example due to the distance from the user's device and a wireless transceiver. In such cases, video conferencing may not be possible as video signals require the transmission of a substantial amount of data.

SUMMARY

In general, one innovative aspect of the subject matter described in this specification can be embodied in methods that include the actions of generating a first linear arrangement of images captured during an interactive session, the images of the first linear arrangement of images being arranged in order based on a sequence in which the images were captured; providing the first linear arrangement of images for display; receiving selection data specifying a selection of an image of the first linear arrangement of images; in response to receiving the selection data: creating a branch point at the selected image, the branch point defining a branch from the selected image to a second linear arrangement of images different than the first linear arrangement of images; receiving additional images captured during the interactive session and subsequent to receipt of the selection data; and generating the second linear arrangement of images, the second linear arrangement of images including the additional images arranged in order based on a sequence in which the images were captured. Other embodiments of this aspect include corresponding systems, apparatus, and computer programs, configured to perform the actions of the methods, encoded on computer storage devices.

These and other embodiments can each optionally include one or more of the following features. Aspects can further include determining that the interactive session has ended; and in response to determining that the interactive session has ended, storing the first linear arrangement of images and second linear arrangement of images. Aspects can further include determining that the interactive session has resumed; providing the first linear arrangement of images and the second arrangement of images for display; receiving at least one additional image during the resumed interactive session; determining that the interactive session ended during a portion of the interactive session related to the first linear arrangement of images; and adding the at least one additional image to the first linear arrangement of images in response to determining that the interactive session ended during a discussion related to the first linear arrangement of images.

Generating a first linear arrangement of images captured during an interactive session can include determining that a particular image captured during the interactive session is sufficiently different than a previously captured image; and adding the particular image to the first linear arrangement of images in response to determining that the particular image is sufficiently different than a previously captured image. Generating a first linear arrangement of images captured during an interactive session can include receiving a command to capture an image during the interactive session; capturing an image in response to receiving the command; and adding the captured image to the first linear arrangement of images.

Aspects can further include transmitting the first linear arrangement of images to a device associated with a participant of the interactive session for display by the device. The selection data can be received from the device associated with the participant. Transmitting the first linear arrangement of images to the device associated with the participant can include transmitting the first linear arrangement of images based on an amount of available bandwidth for sending data.

Receiving selection data specifying a selection of an image can include receiving data specifying that a participant selected the image. Generating the second linear arrangement of images can include determining that a particular image of the additional images is sufficiently different than a previously captured image of the additional images; and adding the particular image to the second linear arrangement of images in response to determining that the particular image is sufficiently different than a previously captured image.

Particular embodiments of the subject matter described in this specification can be implemented so as to realize one or more of the following advantages. Images and/or video portions can be transmitted during an interactive session, for example when network conditions preclude continuous video conferencing. Interactive sessions can be stored and augmented with images or videos captured during the sessions such that the sessions can be revisited or continued at a later date. Images captured during an interactive session can be arranged in linear arrangements, for example based on the time at which the images were captured. Users can return to a particular point in an interactive session by selecting an image that was captured at that point in the session. A branch point can be created at the selected image and another linear arrangement of images can be created from the branch point.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A system can augment an interactive session with a stream of images or videos captured during the interactive session. As the ability to conduct a video conference between users may not be possible, for example due to network limitations, the system can enable the transmission of images or video portions captured during the interactive session and augment the interactive session with the images or video portions. For example, the system may generate a sequence of images and transmit the images as the network conditions allow. The system may also store the audio portion of the interactive session with a reference to the images so that the interactive session can be reviewed or resumed at a later time.

Images can be selected for transmission by a user, or by the system. In some implementations, the system selects an image for transmission in response to the image being sufficiently different than a previously captured image. For example, if a user moves a camera to record video of a different object than what was previously being recorded, the system may detect the difference, capture a still image or video clip in response to detecting the difference, and select the image or video clip for transmission.

The system can display captured images or images representative of video clips to users participating in an interactive session. The images can be displayed in one or more arrangements, such as one or more linear arrangements or non-linear arrangements. For example, images may be displayed in straight lines and arranged in each line according to the time at which the images were captured. A user may create a branch point in the interactive session by selecting an image displayed in a linear arrangement. In general, the branch point defines a branch from the selected image to an additional linear arrangement of images. Images captured after the selection may be added to the additional linear arrangement.

Figure 1:
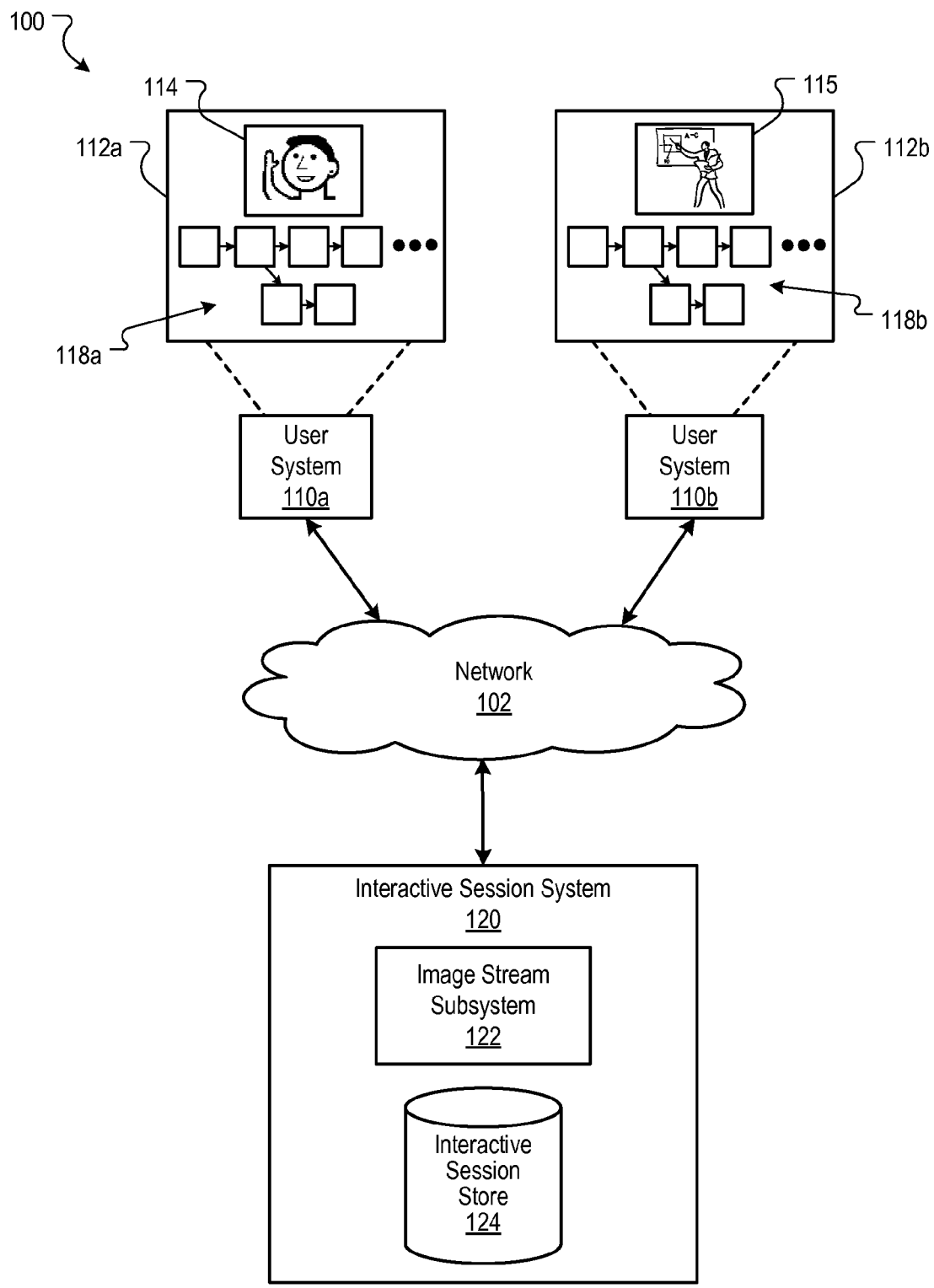
FIG. 1 is an example environment in which an interactive session system generates image streams for interactive sessions.

FIG. 1 is an example environment 100 in which an interactive session system 120 generates image streams for interactive sessions. A data communication network 102 enables data communication between multiple electronic devices. Users can access content, provide content, exchange information, and participate in interactive sessions by way of the devices and systems that can communicate with each other over the network 102. The network 102 can include, for example, a local area network (LAN), a cellular phone network, a wide area network (WAN), e.g., the Internet, or a combination of them.

A user system 110a, 110b is an electronic device, or collection of devices, that is capable of requesting and receiving resources over the network 102. Example user systems 110a and 110b include personal computers, mobile communication devices, and other devices that can send and receive data over the network 102. A user system 110a, 110b typically includes a user application, e.g., a web browser, that sends and receives data over the network 102, generally in response to user actions. The web browser can enable a user to display and interact with text, images, videos, music and other information typically located on a web page at a website on the world wide web or a local area network.

The user systems 110a and 110b can also allow users to communicate with each other over the network 102. The user systems 110a and 110b can include an audio input device, a video input device, an image input device, a display device, and/or optionally other input devices. For example, the user systems 110a and 110b may each include a microphone, one or more cameras, e.g., video and/or still image camera, a display, e.g., LCD or touchscreen display, and a speaker. The input devices allow the users to communicate using voice, video, still images, and/or text.

An interactive session system 120 is accessible by the user systems 110a and 110b over the network 102. The interactive session system 120 serves interactive sessions and data related to interactive sessions to users of user systems 110a and 110b. The term "interactive session" is used in this specification to refer to a presentation that allows a user to experience an event or receive data related to the event. Events of different types can be presented. In some implementations, events may be "assistance" events, for which interactive sessions provide step-by-step assistance to users to accomplish a particular task, or events may be "experience" events, for which interactive sessions provide users with an experience of participating in an activity. An example interactive session for an assistance event is a session that describes a step-by-step process to build a computer. An example interactive session for an experience event is a session that provides the experience of driving a certain make and model of an automobile. The interactive session system 120 may also provide interactive sessions for other appropriate event types.

Furthermore, the data that the interactive session system 120 provides for an event may also differ based on the event type and based on the intent of the user. For example, interactive sessions for repair events may provide users with a list of tools and parts required to accomplish a task at the beginning of an interactive session. Likewise, a user may have implicitly or explicitly specified an intent for viewing an interactive session, and the interactive session system 120 may also determine specific data to provide based on the intent. For example, a user that is viewing a session that describes building a computer, and with the intent to build the computer, may be presented with additional information, e.g., a list of parts, tools and the time required to complete the task. Another user that is watching the same session with the intent to learn about computers may be presented with other information, e.g., articles about memory, heat dissipation, or other computer related topics, in a side panel of a viewing environment as the interactive session is presented.

The interactive sessions can be created by assistants, such as expert assistants, or non-expert users. An "assistant" can be a user or entity that has been accepted by the system 120 for a category, e.g., as a result of the user's or entity's having provided credentials or demonstrated a high level of skill. An "expert assistant" may be an assistant with a high level of skill or expertise in a particular area. Examples of expert assistants include a licensed contractor for construction related videos or a company that produces sessions for a particular product the company manufactures and a user that has produced a large number of highly rated sessions. An assistant does not have to have a particular level of skill or have produced a large number of highly rated sessions. For example, an assistant may simply be a friend or acquaintance of another user that knows how to accomplish a task, such as programming a universal remote control. This assistant and the other user can participate in an interactive session where the assistant helps the other user program a universal remote control.

The interactive sessions can include conversations between two or more participants. For example, the interactive session system 120 can host audio and/or video conversations between users, such as assistants and other users. The conversations can be recorded and stored as interactive sessions. These interactive sessions may be accessible by the participants of the interactive session, and in some implementations by others. For example, a math tutor may teach a student how to solve a particular type of math problem by way of an interactive session. This interactive session may be recorded as a session, so that the tutor and student can review or resume the interactive session at a later time, or so that other users can consume the interactive session. For example, other students may access the interactive session to learn how to solve the particular type of math problem.

The interactive session system 120 includes an image stream subsystem 122 that facilitates the transmission of images and video between user systems 110a and 110b and augments interactive sessions with images, such as images captured during the interactive sessions. Although the image stream subsystem 122 is illustrated as part of the interactive session system 120, the image stream subsystem 122, or aspects thereof, may be implemented as a separate system or as part of a user system 110a, 110b. For example, aspects of the image stream subsystem 122 that identify images for transmission and/or aspects that determine when to transmit images may be implemented on the user systems 110a and 110b. These aspects may be implemented by way of a web application and/or user interface provided to the user systems 110a and 110b from the interactive session system 120.

While users are engaged in an interactive session via the interactive sessions system 120, one or more of the users can have a video input device streaming video to the interactive session system 120. Still images from the video stream, or video portions, can be captured and queued for transmission to the other user's system. The images or video portions can be selected for the queue in multiple ways. In some implementations, the images or video portions are selected by the user controlling the user system 110a, 110b at which the images or video portions are being captured. For example, the image stream subsystem 122 may provide a user interface that allows the user to select images from the video stream to add to the queue.

In some implementations, the image stream subsystem 122 selects images or video portions to add to the queue. For example, the image stream subsystem 122 may determine which images or video portions contain a new aspect of the interactive session and select those images for the queue. The image stream subsystem 122 may select an image that is sufficiently different than a previous image. For example, assume that the video stream has mostly depicted the user's face. If the user picks up an object, such as a tool or mobile phone, the image may have changed enough to warrant a transmittable image and the image stream subsystem 122 may add the image to the queue for transmission.

The image stream subsystem 122 may determine whether an image or video frame is sufficiently different than a previous image or video frame in several ways. The image stream subsystem 122 may determine how many pixels of an image differ from the corresponding pixels of a previous image. For example, the pixel in the top left corner of the image can be compared to the pixel in the top left corner of the previous image; the top right pixel of the image can be compared to the top right pixel of the previous image, and so on. The number of pixels that are different can be compared to a pixel threshold value, such as 10% of the total number of pixels for the image. If the number of pixels that differ satisfies the threshold, e.g., exceeds the threshold, the image stream subsystem 122 may determine that the image is sufficiently different that the previous image.

The image stream subsystem 122 can perform a similar analysis using images features, such as borders, edges, interest points, color, contrast, etc. If at least a threshold number of features of the image differ from the features of the previous image, the image stream subsystem 122 may determine that the image is sufficiently different that the previous image.

The image stream subsystem 122 can transmit the images or video portions to another user, for example based on network conditions. If the available bandwidth is insufficient, the image stream subsystem 122 may send the images or video portions one at a time when the bandwidth is sufficient. If the available bandwidth is higher, the image stream subsystem 122 may send the images or video portions in bundles based on the amount of available bandwidth.

The transmitted images or video portions are received by user systems 110a and 110b of users that are participating in the interactive session and displayed on the user systems 110a, 110b. For example, the user system 110b may receive a video stream of a math tutor solving a math problem and display the video stream in a window 115 of a display 112b of the user system 110b. The image stream subsystem 122 may also generate a queue of images, or image stream, from the video stream for transmission to the user device 110a. These images 118b may be displayed on the display 112b of the user system 110b and may also be transmitted to the user system 110a for display on the display 112a of the user system 110a. As shown in FIG. 1, both user systems 110a and 110b may display the images.

The images 118b may be arranged in linear arrangements. In the example illustrated in FIG. 1, the images 118b are arranged in two straight lines that extend horizontally across the display 112b. The linear arrangements of images can be based on portions of an interactive session, e.g., particular discussions, to allow users to return to the portions. For example, images captured at the beginning of an interactive session may be placed into a linear arrangement, e.g., an original or first linear arrangement of images, in the order in which the images were captured. At some point in the interactive session, one of the users may want to return to a particular point in the interactive session at which an image was captured. The user may select that image. In response, the image stream subsystem 122 can create a branch point at the selected image. The branch point can define a branch from the selected image to an additional linear arrangement of images, e.g., a second linear arrangement of images, which is different than the first linear arrangement of images. Images captured subsequent to the selection may be added to the second linear arrangement of images.

To illustrate, consider an interactive session between a math tutor and a student. The math tutor may be teaching a student how to solve a particular type of math problem using only voice due to network conditions being insufficient for a video conference. During the interactive session, the math tutor may use a camera to stream video of the tutor's work on a whiteboard. The math tutor may also cause the image stream subsystem 122 to capture images from the video stream at particular points in the interactive session, such as at each step in solving the math problem. In addition, or in the alternative, the image stream subsystem 122 may capture images from the video stream, for example based on changes in the video stream. These images may be displayed in a linear arrangement on the tutor's system and may also be transmitted to the student's system for display in a similar linear arrangement.

If the student has a question about a particular step later in the interactive session, the student may select the image that corresponds to the discussion of that step. In response, that image may be highlighted on the student's display and on the tutor's display. The image stream subsystem 122 may also create a branch point at the selected image to start an additional linear arrangement of images for this discussion of that particular step in solving the math problem. The tutor and student may continue their discussion of that particular step. During the discussion, the tutor (or the image stream subsystem 122) may cause additional images to be captured. These additional images may be placed into the additional linear arrangement of images as the images are related to that discussion. If the tutor or student wants to return to the main discussion, one of them can select the last image in the original linear arrangement. In response, subsequently captured images may be added to the original linear arrangement of images.

The interactive sessions and images captured during the interactive sessions can be stored in an interactive session store 124 for later use. The interactive sessions and images may be stored such that the images can be displayed in the linear arrangements that were created during the interactive session. For example, the interactive session store 124 may store data specifying the linear arrangements, the images in each linear arrangement, and the position of each image in each linear arrangement. Continuing the previous example, the student may want to review the interactive session while preparing for an exam. When reviewing the interactive session, the images captured during the interactive session may be displayed in the linear arrangements so that the student can follow the steps in solving the math problem. The student and tutor can also access the interactive session in the interactive session store 124 to resume their interactive session.

During the resumed session, additional images may be added to the linear arrangements similar to the original session. The image stream subsystem 122 can determine which linear arrangement of images to add the additional images to, for example based on where the session ended. For example, if the session ended during a portion of the interactive session that related to a particular linear arrangement of images, the image stream subsystem 122 may add the additional images to the particular linear arrangement of images. Example processes for generating linear arrangements of images are described below.

Figure 2:
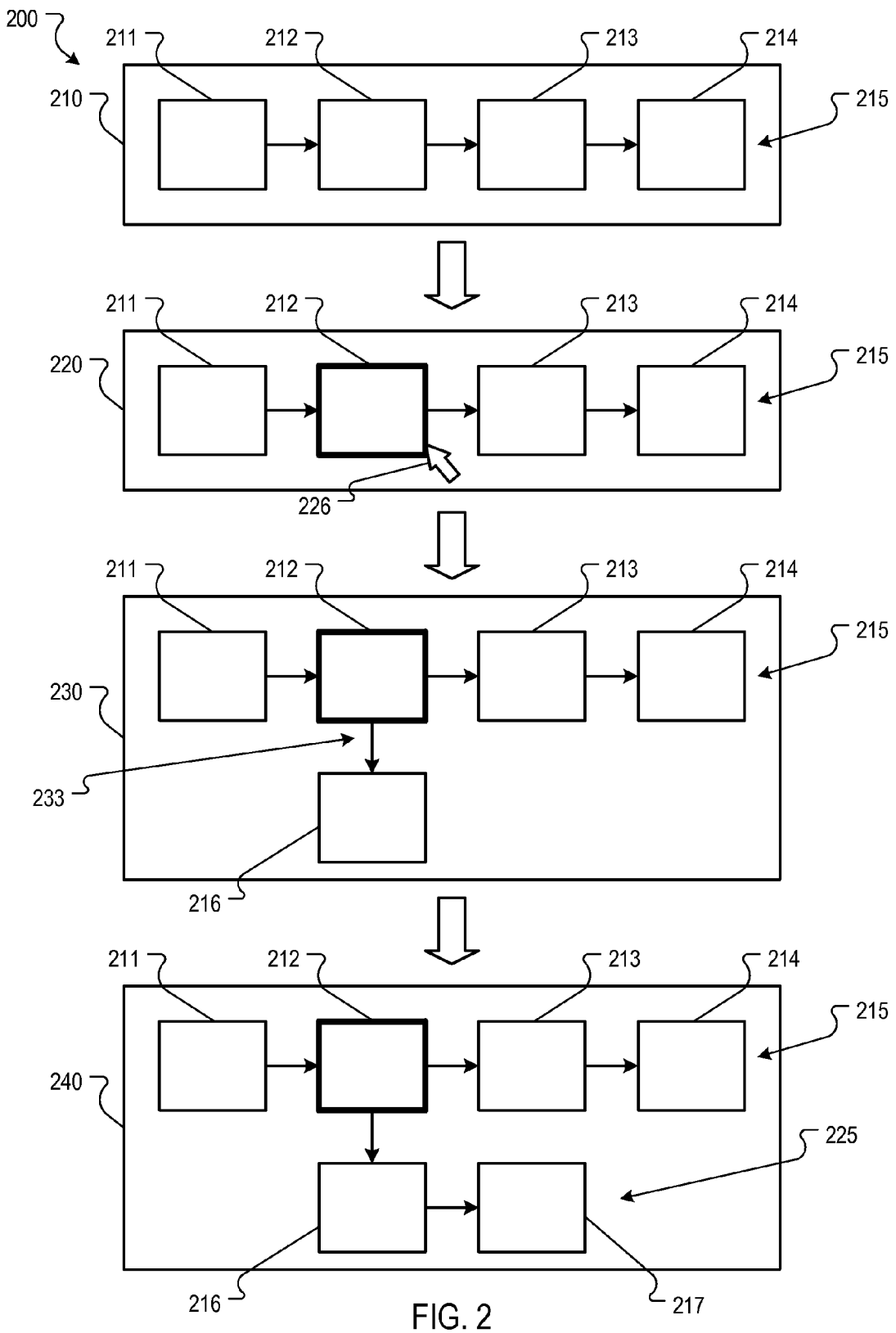
FIG. 2 is a block diagram depicting an example data flow for generating an image stream for an interactive session.

FIG. 2 is a block diagram depicting an example data flow 200 for generating an image stream for an interactive session. The example data flow 200 begins with the image stream subsystem 122 generating a linear arrangement of images 215 (210). For example, the image stream subsystem 122 may generate the linear arrangement of images 215 using images captured during an interactive session between two users. The linear arrangement of images 215 may be displayed on user systems associated with participants of the interactive session, for example while the interactive session is taking place and/or after the interactive session is completed.

The linear arrangement of images 215 includes four images 211-214 arranged in a straight line that extends horizontally. Other arrangements are also possible. For example, the images 211-214 may be arranged in a straight line that extends vertically or diagonally, or a non-linear arrangement.

The images 211-214 may be arranged based on the order in which the images were captured by a user system 110*a*, 110*b* or received by the image stream subsystem 122. For example, the image 211 may have been captured before the image 212; the image 212 may have been captured before the image 213, and so on.

The data flow 200 continues with the image 212 being selected (220). For example, a user may select the image 212 using a pointer 226. The pointer 226 may be a mouse-guided pointer or a finger or stylus making contact with a touchscreen, for example. The user may select the image 212 to continue a discussion that was being held when the image 212 was captured. For example, assume the interactive session was directed to assembling a bicycle and the interactive session was held between a user assembling a bicycle and an expert assembler. Also assume that the image 212 was captured during a discussion about installing a hand brake on the bicycle. The user assembling the bicycle may have noticed that the brake was not installed properly and would like to return to that point in the interactive session for help in installing the brake. In this example, the assembling user may tell the expert user that he needs to revisit that discussion and the user may also select the image 212 that was captured during the discussion. The selected image 212 can be highlighted on the display of the expert user and/or the display of the assembling user.

In response to the image 212 being selected, a branch point 233 is created at or near the selected image 212. The branch point 233 defines a branch from the selected image 212 to an additional linear arrangement of images. Continuing the previous example, after the users return to the discussion of installing the brake, the users may discuss how to fix the installation of the brake. This begins a new discussion for which images may be captured. For example, the expert user may demonstrate how to fix the brake on a bicycle and images of the expert user's demonstration may be captured and added to the interactive session.

In some implementations, the branch point includes a visual indicator that shows the branch from the linear arrangement of images 215 to the additional linear arrangement of images. For example, the visual indicator may be an arrow that extends from the selected image to an image in the additional linear arrangement of images.

Images captured after the branch point 233 has been created may be added to an additional linear arrangement of images. For example, an image 216 is captured subsequent to the branch point 233 being created (230). This image 216 is displayed below the selected image 212 and begins the additional arrangement of images 225. Thus, the branch point 233 defines a branch from the arrangement of images 215 to the additional arrangement of images 225.

Another image 217 is captured after the image 216 was captured. This image is added to the additional linear arrangement of images 225 adjacent to the image 216. In this example, the additional arrangement of images 225 are displayed in parallel to the linear arrangement of images 215. Any subsequently captured images may also be added to the additional linear arrangement of images 225 in the order that the images are captured or received.

If an image in the additional arrangement of images 225 is selected, another branch point may be created. This branch point would define a branch from the selected image to another linear arrangement of images. Images captured after the branch point has been created may be added to the other linear arrangement of images similar to the way in which images were added to the additional linear arrangement of images. Of course, any number of linear arrangements of images, each containing any number of images, may be created.

The images captured during the interactive session may be stored, for example in the interactive session store 124, such that the linear arrangements of images can be restored at a later date. For example, the users may want to resume the interactive session at a later date. A user may access the interactive session by way of the interactive session system 120. Once accessed, the linear arrangement(s) of images may be displayed on the user system 110*a*, 110*b* of the user. The interactive session system 120 can also connect the users so that the users can resume their interactive session.

Figure 3:
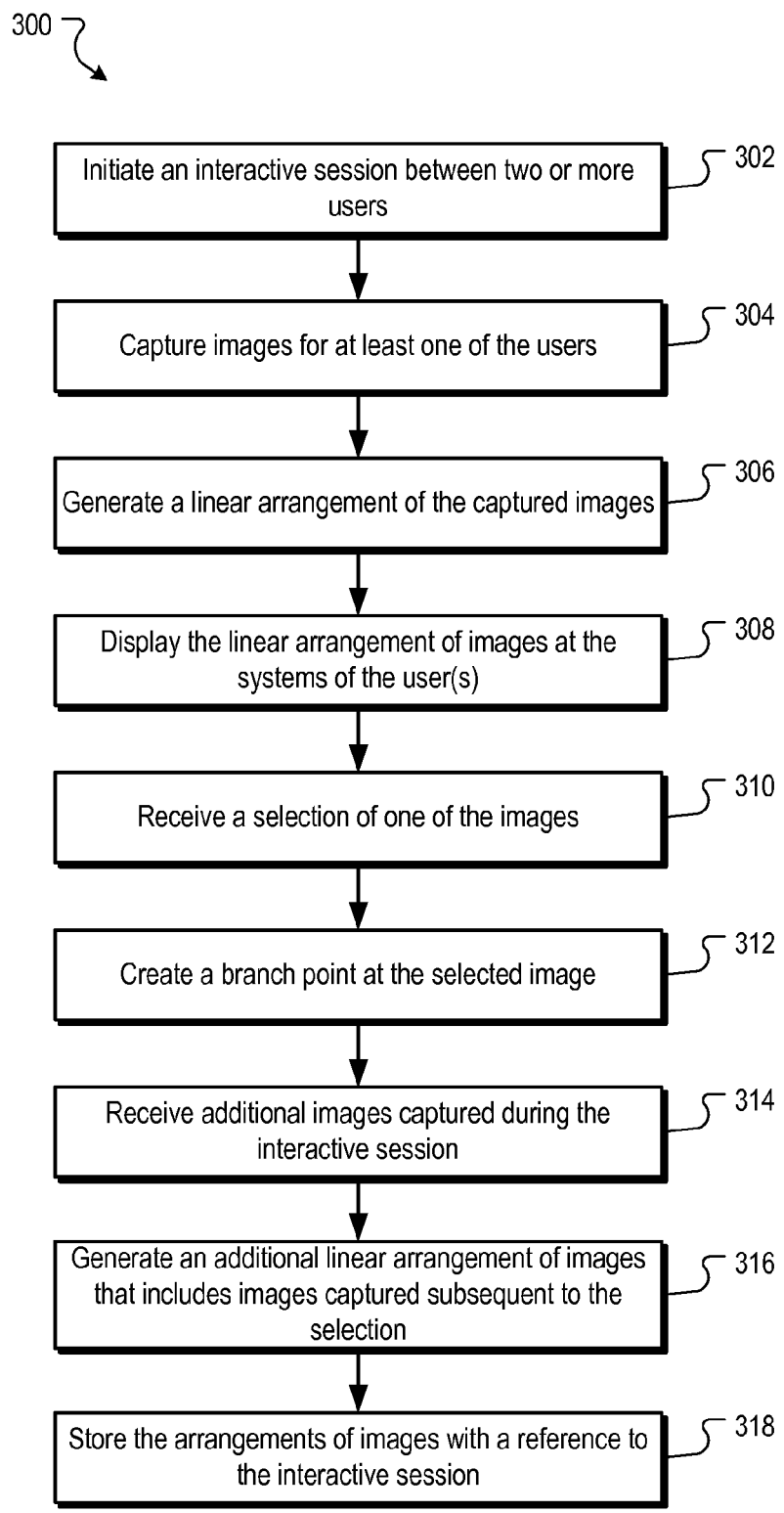
FIG. 3 is a flow chart of an example process for generating linear arrangements of images.

FIG. 3 is a flow chart of an example process 300 for generating linear arrangements of images. Operations of the process 300 can be implemented, for example, by data processing apparatus, such as the interactive session system 120 and/or a user system 110*a*, 110*b* of FIG. 1. The process 300 can also be implemented as instructions stored on computer storage medium such that execution of the instructions by a data processing apparatus cause the data processing apparatus to perform the operations of the process 300.

An interactive session between two or more users is initiated (302). The interactive session can be initiated by a user inviting another user to an interactive session. For example, the user may access the interactive session system 120 to invite the other user to a video conference, an audio conversation, or a photo-based session. In response, the interactive session system 120 may forward the invite to the other user so that the other user may join the interactive session.

Images are captured from at least one of the user's systems during the interactive session (304). For example, each user system may include a video or still image camera that captures images or a video stream during the interactive session. In the case of a video stream, the user(s) or the image stream subsystem 122 may select images from the video stream during the interactive session. For example, a user may click on the video stream at a particular time to capture a still image at that particular time.

A linear arrangement of images is generated from the captured images (306). For example, the image stream subsystem 122 may create a horizontal line of images using the captured images. The images may be arranged in the linear arrangement based on the time at which the images were captured. For example, the image captured may be positioned on the left side of the arrangement, while the most recently captured image is positioned on the right side of the arrangement.

The linear arrangement of images may be displayed at the user systems of the participants (308). For example, if the images are captured at one of the user systems, the image stream subsystem 122 may display the images at that user system almost immediately, or with short delay. The image stream subsystem 122 may also cause the user system to transmit the images and data specifying the arrangement of the images to another user system of a participant in the interactive session. The images may be transmitted to the other user system based on network conditions. For example, the images may be transmitted one by one as bandwidth allows.

Selection data specifying a selection of an image is received (310). For example, a user participating in the interactive session may want to return to a point in the interactive session that corresponds to the selected image. The user may select the image, for example using a pointer. In response, the user's system may send data specifying the selected image to the image stream subsystem 122.

A branch point is created at the selected image (312). The image stream subsystem 122 may create the branch point in response to receiving the selection data. The branch point defines a branch from the selected image to an additional linear arrangement of images different than the linear arrangement of images. The branch point may include a visual indicator, such as an arrow, that identifies the branch point to the users.

Additional images captured during the interactive session are received (314). For example, a user system may capture additional images during the interactive session and provide the images to the image stream subsystem 122. These images may correspond to a particular discussion that began with the selected image. Thus, the images captured subsequent to the selection may be used to generate a second linear arrangement of images.

An additional linear arrangement of images is generated (316). The additional linear arrangement of images may be generated using images captured after the selection data was received. The additional linear arrangement of images may be displayed near the linear arrangement of images. For example, the additional linear arrangement of images may be displayed in parallel with the linear arrangement of images.

The images captured during the interactive session are stored (318). For example, the images may be stored in the interactive session store 124 with an audio recording of the interactive session, or with a reference to the audio recording of the interactive session. The images may be stored so that the linear arrangements can be restored during a review of the interactive session or during a continuation of the interactive session. For example, data specifying the position of each image in the linear arrangements may also be stored.

Figure 4:
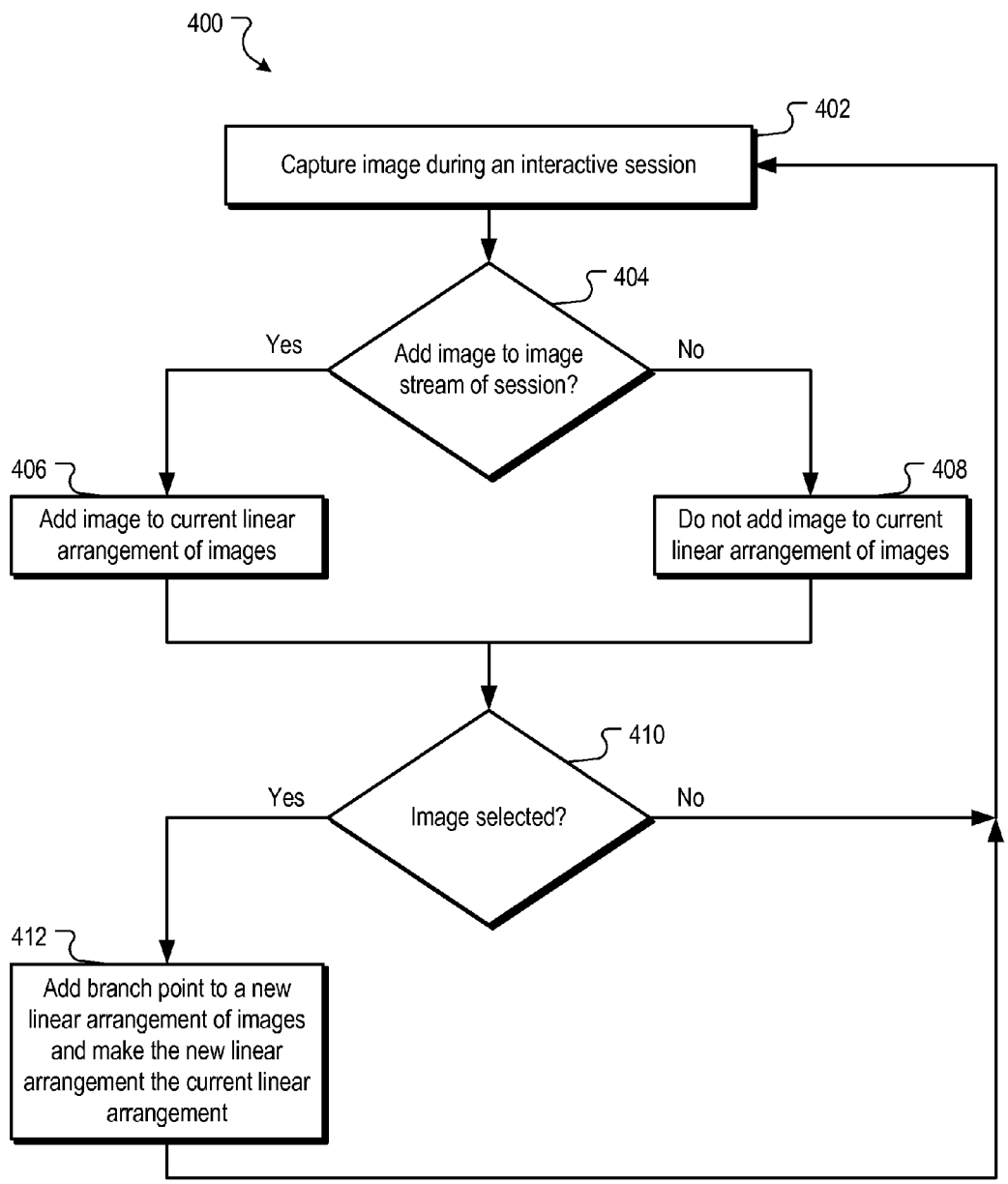
FIG. 4 is flow chart of another example process for generating linear arrangements of images.

FIG. 4 is flow chart of another example process for generating linear arrangements of images. Operations of the process 400 can be implemented, for example, by data processing apparatus, such as the interactive session system 120 and/or a user system 110a, 110b of FIG. 1. The process 400 can also be implemented as instructions stored on computer storage medium such that execution of the instructions by a data processing apparatus cause the data processing apparatus to perform the operations of the process 400.

An image is captured during an interactive session (402). For example, a user may cause a user system to capture an image from a video stream during an interactive session. In another example, the image stream subsystem 122 may cause an image to be captured from the video stream.

A determination is made whether to add the image to an image stream for the interactive session. For example, the user may determine whether the image should be added to the image stream. Additionally, or alternatively, the image stream subsystem 122 may determine whether to add the image to the image stream. For example, the image stream subsystem 122 may determine whether to add the image based on differences between the image and a previously captured image. If the images are sufficiently different, the image stream subsystem 122 may determine to add the image to the image stream.

If it is determined that the image should be added to the image stream, the image stream subsystem 122 may add the image to the image stream for the interactive session (406). The image may be added to a current linear arrangement of images. For example, the images may be arranged in linear arrangements as described above. Images captured during the interactive session, and selected for addition to the image stream, are added to the current or active linear arrangement of images. If it is determined that the image should not be added to the image stream, the image stream subsystem 122 may not add the image to the image stream (408).

A determination is made whether an image of the image stream has been selected (410). For example, a user participating in the interactive session may select an image of the image stream while the images of the image stream are displayed on the user's system.

If it is determined that an image has been selected, the image stream subsystem 122 may add a branch point at the selected image (412). The branch point may define a branch from the selected image to another linear arrangement of images. For example, a new linear arrangement of images may be created for displaying images captured subsequent to the selection. The branch point may define a branch from the selected image to the new linear arrangement of images.

If an image is not selected (410), or after the branch point is created, the process returns to block 402 where another image is captured. If a determination is made to add the other image to the image stream, the image may be added to the new linear arrangement of images.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    obtaining images captured by one or more image capture devices during an interactive session involving two or more users communicating with each other;
    generating a first linear arrangement of the images, the images of the first linear arrangement of images being arranged in order based on a sequence in which the images were captured, and at least one of the images including content related to the interactive session;
    providing the first linear arrangement of images for display;
    receiving, during the interactive session, selection data specifying a selection, by one of the two or more users, of an image of the first linear arrangement of images;
    in response to receiving the selection data and during the interactive session:
        creating a branch point at the selected image, the branch point (i) defining a branch from the selected image to a second linear arrangement of images different than the first linear arrangement of images and (ii) including a visual indicator that illustrates the branch from the first linear arrangement of images to the second linear arrangement of images;
        receiving additional images captured by the one or more image capture devices (i) during the interactive session and (ii) subsequent to receipt of the selection data; and
        generating the second linear arrangement of images, the second linear arrangement of images including at least a portion of the additional images arranged in order based on a sequence in which the images were captured, including:
            detecting a selection of one or more images of the additional images by at least one of the two or more users during the interactive session; and
            including, in the second linear arrangement of images, each of the one or more selected images.

2. The method of claim 1, further comprising:
    determining that the interactive session has ended; and
    in response to determining that the interactive session has ended, storing the first linear arrangement of images and second linear arrangement of images.

3. The method of claim 2, further comprising:
    determining that the interactive session has resumed;
    providing the first linear arrangement of images and the second arrangement of images for display;
    receiving at least one additional image during the resumed interactive session;
    determining that the interactive session ended during a portion of the interactive session related to the first linear arrangement of images; and
    adding the at least one additional image to the first linear arrangement of images in response to determining that the interactive session ended during a discussion related to the first linear arrangement of images.

4. The method of claim 1, wherein generating a first linear arrangement of images captured during an interactive session comprises:
    determining that a particular image captured during the interactive session is sufficiently different than a previously captured image; and
    adding the particular image to the first linear arrangement of images in response to determining that the particular image is sufficiently different than a previously captured image.

5. The method of claim 1, wherein generating a first linear arrangement of images captured during an interactive session comprises:
    receiving a command to capture an image during the interactive session;
    capturing an image in response to receiving the command; and
    adding the captured image to the first linear arrangement of images.

6. The method of claim 1, further comprising transmitting the first linear arrangement of images to a device associated with a particular user of the two or more users for display by the device.

7. The method of claim 6, wherein the selection data is received from the device associated with the particular user.

8. The method of claim 6, wherein transmitting the first linear arrangement of images to the device associated with the particular user comprises transmitting the first linear arrangement of images based on an amount of available bandwidth for sending data.

9. The method of claim 1, wherein receiving selection data specifying a selection of an image comprises receiving data specifying that the one user of the two or more users selected the image.

10. The method of claim 1, wherein generating the second linear arrangement of images comprises:
    determining that a particular image of the additional images is sufficiently different than a previously captured image of the additional images; and adding the particular image to the second linear arrangement of images in response to determining that the particular image is sufficiently different than a previously captured image.

11. A system, comprising:

a data processing apparatus; and a memory storage apparatus in data communication with the data processing apparatus, the memory storage apparatus storing instructions executable by the data processing apparatus and that upon such execution cause the data processing apparatus to perform operations comprising:

obtaining images captured by one or more image capture devices during an interactive session involving two or more users communicating with each other;

generating a first linear arrangement of the images, the images of the first linear arrangement of images being arranged in order based on a sequence in which the images were captured, and at least one of the images including content related to the interactive session;

providing the first linear arrangement of images for display;

receiving, during the interactive session, selection data specifying a selection, by one of the two or more users, of an image of the first linear arrangement of images;

in response to receiving the selection data and during the interactive session:

creating a branch point at the selected image, the branch point (i) defining a branch from the selected image to a second linear arrangement of images different than the first linear arrangement of images and (ii) including a visual indicator that illustrates the branch from the first linear arrangement of images to the second linear arrangement of images;

receiving additional images captured by the one or more image capture devices (i) during the interactive session and (ii) subsequent to receipt of the selection data; and generating the second linear arrangement of images, the second linear arrangement of images including at least a portion of the additional images arranged in order based on a sequence in which the images were captured, including:

detecting a selection of one or more images of the additional images by at least one of the two or more users during the interactive session; and including, in the second linear arrangement of images, each of the one or more selected images.

12. The system of claim 11, wherein the instructions upon execution cause the data processing apparatus to perform further operations comprising:

determining that the interactive session has ended; and in response to determining that the interactive session has ended, storing the first linear arrangement of images and second linear arrangement of images.

13. The system of claim 12, wherein the instructions upon execution cause the data processing apparatus to perform further operations comprising:

determining that the interactive session has resumed;

providing the first linear arrangement of images and the second arrangement of images for display;

receiving at least one additional image during the resumed interactive session;

determining that the interactive session ended during a portion of the interactive session related to the first linear arrangement of images; and adding the at least one additional image to the first linear arrangement of images in response to determining that the interactive session ended during a discussion related to the first linear arrangement of images.

14. The system of claim 11, wherein generating a first linear arrangement of images captured during an interactive session comprises:

determining that a particular image captured during the interactive session is sufficiently different than a previously captured image; and adding the particular image to the first linear arrangement of images in response to determining that the particular image is sufficiently different than a previously captured image.

15. The system of claim 11, wherein generating a first linear arrangement of images captured during an interactive session comprises:

receiving a command to capture an image during the interactive session;

capturing an image in response to receiving the command; and adding the captured image to the first linear arrangement of images.

16. The system of claim 11, further comprising transmitting the first linear arrangement of images to a device associated with a particular user of the two or more users for display by the device.

17. The system of claim 16, wherein the selection data is received from the device associated with the particular user.

18. The system of claim 16, wherein transmitting the first linear arrangement of images to the device associated with the particular user comprises transmitting the first linear arrangement of images based on an amount of available bandwidth for sending data.

19. The system of claim 11, wherein generating the second linear arrangement of images comprises:

determining that a particular image of the additional images is sufficiently different than a previously captured image of the additional images; and adding the particular image to the second linear arrangement of images in response to determining that the particular image is sufficiently different than a previously captured image.

20. A non-transitory computer readable medium encoded with a computer program, the program comprising instructions that when executed by a data processing apparatus cause the data processing apparatus to perform operations comprising:

obtaining images captured by one or more image capture devices during an interactive session involving two or more users communicating with each other;

generating a first linear arrangement of the images, the images of the first linear arrangement of images being arranged in order based on a sequence in which the images were captured, and at least one of the images including content related to the interactive session;

providing the first linear arrangement of images for display;

receiving, during the interactive session, selection data specifying a selection, by one of the two or more users, of an image of the first linear arrangement of images;

in response to receiving the selection data and during the interactive session:

creating a branch point at the selected image, the branch point (i) defining a branch from the selected image to a second linear arrangement of images different than the first linear arrangement of images and (ii) including a visual indicator that illustrates the branch from the first linear arrangement of images to the second linear arrangement of images;

receiving additional images captured by the one or more image capture devices (i) during the interactive session and (ii) subsequent to receipt of the selection data; and generating the second linear arrangement of images, the second linear arrangement of images including at least a portion of the additional images arranged in order based on a sequence in which the images were captured, including:

detecting a selection of one or more images of the additional images by at least one of the two or more users during the interactive session; and including, in the second linear arrangement of images, each of the one or more selected images.

21. The method of claim 1, wherein the first linear arrangement of images is generally parallel with the second linear arrangement of images.

22. The method of claim 1, further comprising:
subsequent to receipt of the selection data:
receiving additional selection data specifying a selection of a last image in the first linear arrangement of images;
receiving a given image captured during the interactive sessions and subsequent to receipt of the additional selection data; and
adding the given image to the first linear arrangement of images and adjacent to the last image.

23. The method of claim 1, wherein the first linear arrangement of images relate to a first portion of the interactive sessions and the second linear arrangement of images relate to a second portion of the interactive session different from the first portion.

24. The method of claim 8, wherein transmitting the first linear arrangement of images based on an amount of available bandwidth for sending data comprises:

determining that the amount of available bandwidth is not sufficient to the transmit the first linear arrangement of images and, in response, queuing the first linear arrangement of images for transmission; and determining that the amount of bandwidth has increased to a sufficient amount of bandwidth and, in response, transmitting the first linear arrangement of images in an order in which the first linear arrangement of images were captured.

* * * * *